Feb. 24, 1925.

W. H. TOPE

COLLAPSIBLE COT

Filed July 21, 1924    2 Sheets-Sheet 1

1,527,615

Inventor:-
Wm. H. Tope
By Milo B. Stevens Co.
Attorneys.

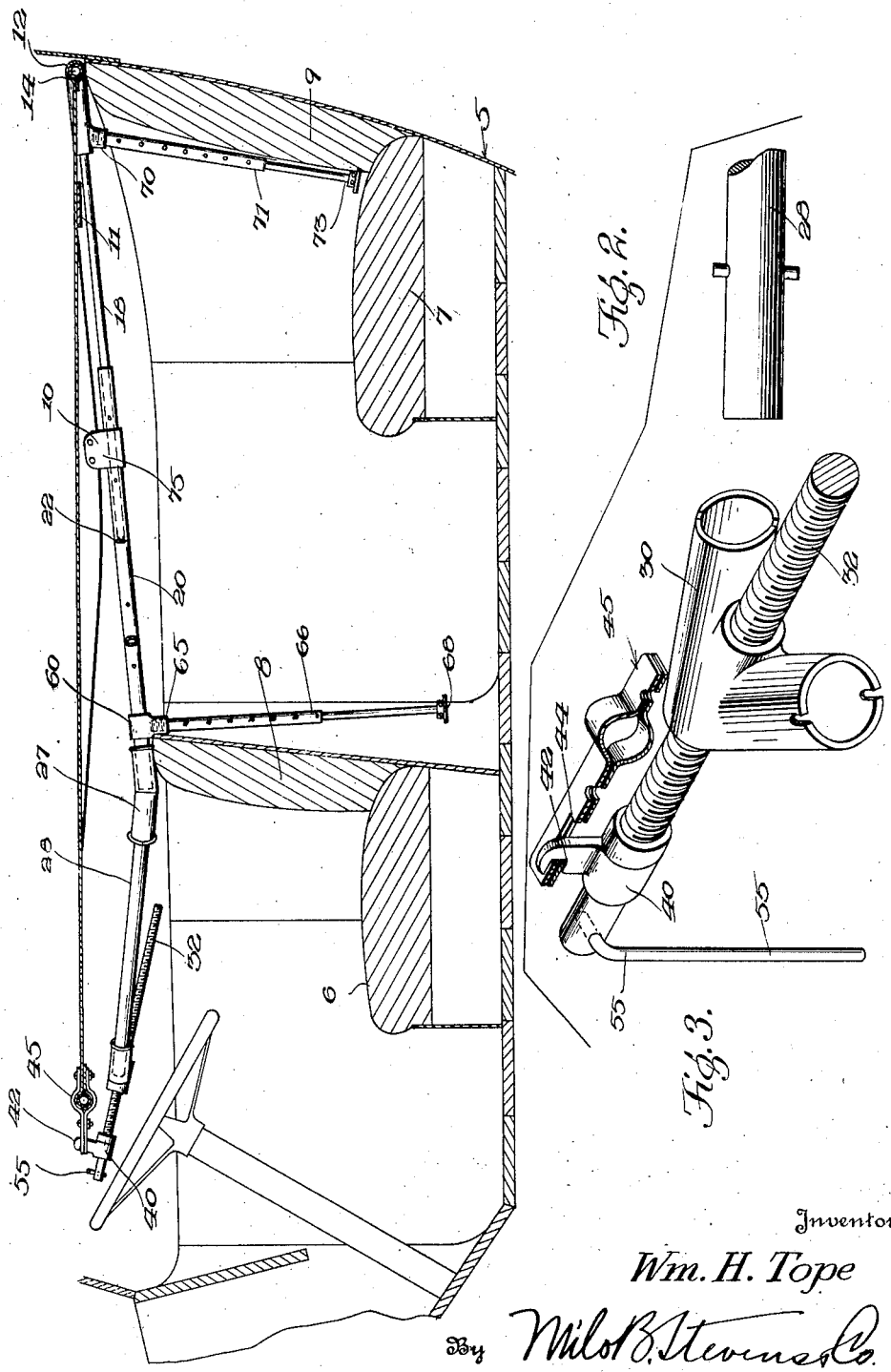

Patented Feb. 24, 1925.

1,527,615

UNITED STATES PATENT OFFICE.

WILLIAM H. TOPE, OF CHICAGO, ILLINOIS.

COLLAPSIBLE COT.

Application filed July 21, 1924. Serial No. 727,393.

*To all whom it may concern:*

Be it known that I, WILLIAM H. TOPE, a citizen of the United States, residing at Chicago, in the county of Cook and State of Illinois, have invented new and useful Improvements in Collapsible Cots, of which the following is a specification.

This invention relates to collapsible cots especially adapted for use on automobiles and in camping.

The invention forming the subject matter of this application is an improvement on my application Ser. No. 625,874 filed February 4, 1923 and it is designed to provide a collapsible cot conveniently applied to an automobile and securely and positively held in the desired position and support one or more occupants.

Further an important aim of the invention is to provide a cot which may be mounted upon the ground or other fairly flat surface in a highly convenient and expeditious manner and which when not in use may be compactly folded so that the same occupies but a small amount of space.

A further object of the invention is to provide a collapsible cot which is of highly simplified construction, durable in use and cheap to manufacture.

Other objects and advantages will be apparent during the course of the following description.

In the accompanying drawings forming a part of this application and in which like numerals are employed to designate like parts throughout the same, Figure 1 is a plan view of the improved collapsible cot set up in an automobile, parts being broken away;

Fig. 2 is a vertical longitudinal sectional view through the improved cot in use on an automobile;

Fig. 3 is a detail perspective view illustrating the tensioning means for the occupant supporting sheet.

Figure 1:
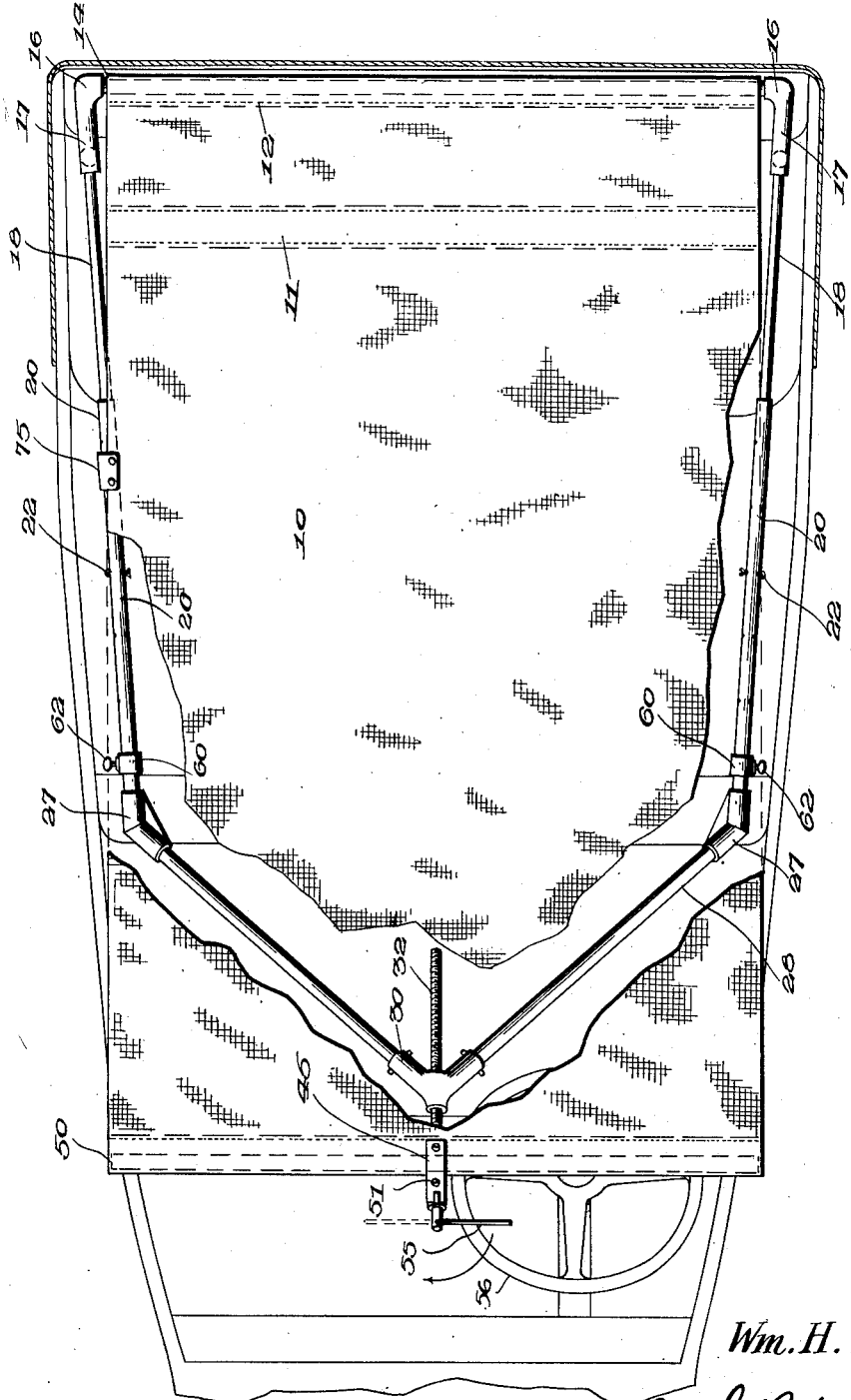

In the accompanying drawings wherein for the purpose of illustration is shown preferred embodiment of the invention, the numeral 5 designates a vehicle body having front and rear seats 6 and 7 respectively and the seats are provided with backs 8 and 9.

The improved cot consists of a main occupant supporting sheet 10 the rear portion of which is provided with transverse hems 11 and 12 either one of which may be engaged by a cross pipe 14. In case the vehicle body is short as in the case of a Ford automobile the cross pipe or bar 14 may be extended through the hem 11.

The cross bar is connected at its ends to elbows 16 having long forwardly extending branches 17 which snugly receive the rear ends of the sections 18 of the side rails. However there is no rigid connection between the sections 18 and the forwardly extending branches 17 of the elbows 16.

The side rails of the bed or cot also have female forward sections 20 which receive the sections 18. Cotter pins or other fastening devices 22 may be extended through openings in the sections 20 so as to limit forward movement of the sections 18. The cotter pins engage the forward ends of the sections 18 and do not extend through the same.

The forward portions of the sections 20 of the extensible side rails are connected to elbows 27 having diagonally extending forward branches connected to diagonally extending pipes or end members 28. However the diagonally extending end members 28 are tightly fitted in the inwardly extending branches of the elbows 27. The connection between the members 20 and the elbows 27 permits of the quick detachment of the members 20 from the elbows 27.

The forward portion of the tubular members 28 extend into the branches of a Y-shaped coupling member 30 and an adjusting screw 32 is extended through the Y-shaped member 30.

The adjusting screw has threaded engagement with the Y-shaped member 30 and freely extends through a sleeve 40 having an upwardly extending lug 42 which as illustrated in Fig. 3 is extended through a slot 44 in the sheet attaching member generally designated by the numeral 45.

The sheet attaching member 45 is in the nature of upper and lower plates which engage the opposite sides of the sheet 10 and straddle the rigid cross member 50 at the forward end of the sheet. Suitable fastening devices 51 are extended through the upper and lower plates constituting a sheet attaching member.

The adjusting screw 32 has its forward end apertured for the reception of a handle 55. The handle 55 may be rotated so that the same is swung clear of the steering wheel 56. This is illustrated in Fig. 1.

The side rails may be provided with an attaching member 60 of T-shaped formation and which is provided with a thumb screw 62 by means of which the sleeve may be secured in position. Fig. 2 illustrates that the several sleeves 60 are provided with downwardly extending branches 65 which engage the rear side of the back 8 and which may be threaded for the reception of extensible legs 66. If found necessary the lower portions of the extensible legs 66 may be provided with fastening devices 68 in the nature of brackets which may be secured to the sides or the bottom of the body.

Also the elbows 16 and more particularly the branches 17 of the same may be provided with downwardly extending socket 70 for threaded engagement with extensible legs 71. The lower portions of the extensible legs 71 may be provided with attaching brackets 73.

In the use of the improved collapsible cot on an automobile it is positioned as illustrated in Fig. 3 and attaching straps 75 may be mounted on the side rails and connected to the edges of the supporting sheet 10 as illustrated in Figs. 1 and 2. This effectively stabilizes the supporting sheet and prevents the same from tilting a substantial extent in case one occupant is heavier than the other occupant.

As the result of continued use of a collapsible cot constructed in accordance with this invention it has been found that the sheet will not tilt an objectionable extent due to the employment of the attaching straps 75.

It will be seen that the major portion of the weight of the occupant is borne by that portion of the sheet adjacent the straps 75 and the weight on the attaching member 45 is negligible and does not in any way cause the sheet to tilt.

As stated above actual use of the improved sheet demonstrates that it is well balanced and if the occupants are not of the same weight the supporting sheet will not tilt to an objectionable extent.

Having thus described the invention, what is claimed is:

1. A collapsible cot comprising a cross member, elbows connected to the cross member and having forwardly extending branches, extensible rails secured to the forwardly extending branches of said elbows, a second set of elbows secured to said extensible rails, a pair of diagonally extending end members secured to said second set of elbows, a Y-shaped connecting member secured to the forward portions of said diagonally extending end members, an adjusting screw threaded through said Y-shaped connecting member, a sleeve mounted on said adjusting screw, a supporting sheet connected at its rear end to said cross member, and an attaching device joining the forward portions of said sheet to said sleeve.

2. A collapsible cot comprising a cross member, elbows connected to the cross member and having forwardly extending branches, extensible rails secured to the forwardly extending branches of said elbows, a second set of elbows secured to said extensible rails, a pair of diagonally extending end members secured to said second set of elbows, a Y-shaped connecting member secured to the forward portions of said diagonally extending end members, an adjusting screw threaded through said Y-shaped connecting member, a sleeve mounted on said adjusting screw, a supporting sheet connected at its rear end to said cross member, an attaching device joining the forward portions of said sheet to said sleeve, and sleeves mounted on said extensible rails and adapted to engage the back of an automobile seat to hold the device against endwise movement in one direction.

3. A collapsible cot comprising a cross member, elbows connected to the cross member and having forwardly extending branches, extensible rails secured to the forwardly extending branches of said elbows, a second set of elbows secured to said extensible rails, a pair of diagonally extending end members secured to said second set of elbows, a Y-shaped connecting member secured to the forward portions of said diagonally extending end members, an adjusting screw threaded through said Y-shaped connecting member, a sleeve mounted on said adjusting screw a supporting sheet connected at its rear end to said cross member, an attaching device joining the forward portions of said sheet to said sleeve, sleeves mounted on said extensible rails and adapted to engage the back of an automobile seat to hold the device against endwise movement in one direction, and extensible legs secured to said second named sleeve.

4. A collapsible cot comprising a cross member, elbows connected to the cross member and having forwardly extending branches, extensible rails secured to the forwardly extending branches of said elbows, a second set of elbows secured to said extensible rails, a pair of diagonally extending end members secured to said second set of elbows, a Y-shaped connecting member secured to the forward portions of said diagonally extending end members, an adjusting screw threaded through said Y-shaped connecting member, a sleeve mounted on said adjusting screw, a supporting sheet connected at its rear end to said cross member, an attaching device joining the forward portions of said sheet to said sleeve, sleeves mounted on said extensible rails and adapted to engage the back of an automobile seat to hold the device against endwise movement in one direction, extensible legs secured to said second named sleeve and attaching straps mounted on said rails and secured to the longitudinal edge portions of said sheet.

5. A collapsible cot comprising a cross member, elbows connected to the cross member and having forwardly extending branches, extensible rails secured to the forwardly extending branches of said elbows, a second set of elbows secured to said extensible rails, a pair of diagonally extending end members secured to said second set of elbows, a Y-shaped connecting member secured to the forward portions of said diagonally extending end members, an adjusting screw threaded through said Y-shaped connecting member, a sleeve mounted on said adjusting screw, a supporting sheet connected at its rear end to said cross member, an attaching device joining the forward portions of said sheet to said sleeve, sleeves mounted on said extensible rails and adapted to engage the back of an automobile seat to hold the device against endwise movement in one direction, extensible legs secured to said second named sleeve and attaching straps mounted on said rails and secured to the longitudinal edge portions of said sheet and extensible legs detachably connected to the forwardly extending branches of said first named elbows.

6. A collapsible cot comprising a cross bar, elbows secured to the cross bar and extensible side rails secured to the elbows, a second set of elbows secured to the side rails, diagonally extending end members secured to the second named elbows, a Y-shaped coupling having connection with said diagonally extending end members, and an adjusting screw extending through said Y-shaped coupling, a supporting sheet connected to said cross bar, and means connecting said supporting sheet to said adjusting screw.

In testimony whereof I affix my signature.

WILLIAM H. TOPE.